US008180859B2

(12) United States Patent
Koch et al.

(10) Patent No.: US 8,180,859 B2
(45) Date of Patent: May 15, 2012

(54) SYSTEM AND METHODS FOR REMOTELY RECOVERING AND PURGING DATA FROM A WIRELESS DEVICE IN A COMMUNICATIONS NETWORK

(75) Inventors: Robert Koch, Norcross, GA (US); Robert Andres, Marietta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 12/958,297

(22) Filed: Dec. 1, 2010

(65) Prior Publication Data

US 2011/0078501 A1     Mar. 31, 2011

Related U.S. Application Data

(63) Continuation of application No. 10/881,669, filed on Jun. 30, 2004, now Pat. No. 7,849,161.

(51) Int. Cl.
*G06F 15/173* (2006.01)

(52) U.S. Cl. ...... 709/219; 709/217; 455/411; 455/456.1

(58) Field of Classification Search ................. 709/219, 709/217; 455/410, 411, 456.1
See application file for complete search history.

(56) References Cited

U.S. PATENT DOCUMENTS

| | | | | |
|---|---|---|---|---|
| 6,658,586 | B1* | 12/2003 | Levi | 714/4.3 |
| 6,662,023 | B1* | 12/2003 | Helle | 455/558 |
| 7,107,349 | B2* | 9/2006 | Britt, Jr. | 709/229 |
| 2002/0112046 | A1* | 8/2002 | Kushwaha et al. | 709/223 |
| 2003/0143980 | A1* | 7/2003 | Choi et al. | 455/411 |
| 2004/0203601 | A1* | 10/2004 | Morriss et al. | 455/411 |
| 2006/0075263 | A1* | 4/2006 | Taylor | 713/194 |

* cited by examiner

*Primary Examiner* — Kevin Bates
(74) *Attorney, Agent, or Firm* — Moazzam & Associates, LLC

(57) ABSTRACT

A system and methods are provided for remotely recovering and purging data from a wireless device in a communications network. The system includes a wireless device capable of executing a data recovery/purge application program for receiving a message from a communications device in the network. The application program retrieves the data in the wireless device, purges the data from the wireless device, and sends a return message, including the data retrieved from the wireless device, to the communications device.

16 Claims, 6 Drawing Sheets

US 8,180,859 B2

SYSTEM AND METHODS FOR REMOTELY RECOVERING AND PURGING DATA FROM A WIRELESS DEVICE IN A COMMUNICATIONS NETWORK

This application is a continuation of U.S. patent application Ser. No. 10/881,669, filed Jun. 30, 2004, now U.S. Pat. No. 7,849,161, the content of which is hereby incorporated by reference herein in its entirety.

TECHNICAL FIELD

The present invention relates to data communications. More particularly, the present invention is related to remotely recovering and purging data from a wireless device in a communications network.

BACKGROUND OF THE INVENTION

Wireless devices for communicating and storing voice and data are becoming commonplace. Users of wireless communication devices are increasingly using their wireless devices to send electronic mail ("E-mail") as well as store personal data, such as contact lists, calendar information, to do lists, and other notes. Much of this data may be considered as private to a user (e.g., passwords, credit card or bank account numbers, telephone numbers, addresses, and calendar or schedule information) and may result in undesirable consequences for the user if the wireless device is lost and falls into the wrong hands.

Many wireless communication devices permit the user to enable a software lock of the device, which prevents use of the device unless a password is entered, and thus protects user data. However, use of this locking feature typically requires additional steps that the user might otherwise not wish to take in operating their device, such as remembering and entering a multi-digit code every time the device is turned on or when an attempt is made to access the user's private data. As a result, the wireless device's locking feature is frequently unused. Moreover, if a device is stolen or lost, even if the locking feature is in place, the user suffers the inconvenience of losing his or her data and wondering if the device had been previously locked. It is with respect to these considerations and others that the various illustrative embodiments of the present invention have been made.

SUMMARY OF THE INVENTION

In accordance with illustrative embodiments of the present invention, the above and other problems are solved by a system and methods for remotely recovering and purging data from a wireless device in a communications network. A user sends a data message containing instructions for recovering and/or purging data to a remotely located wireless device. An application program resident on the wireless device is executed upon receiving the data message and recovers and/or purges user data according to instructions contained in the message. Once the user data has been recovered and purged from the wireless device, the application program generates a return message including the recovered data. By remotely initiating data recovery and purging operations, a user may prevent personal data from being accessed on a lost or stolen wireless device.

According to one aspect of the invention, a system is provided for remotely recovering and purging data from a wireless device in a communications network. The system includes a communications device for sending a message to the wireless device and a data recovery/purge application program resident in the wireless device. The message may be an electronic mail message or a text message. The application program is operative to receive the message from the communications device and parse the message for request data. The request data includes a request to recover data stored on the wireless device, a request to purge the data from the wireless device, and identification data for identifying the wireless device.

The application program is further operative to determine whether the identification data in the received message matches identification data resident in the wireless device and, if the received identification data matches the identification data resident in the wireless device, then the application program is operative to retrieve the data in the wireless device, purge the data from the wireless device, and send a return message, including the data retrieved from the wireless device, to the communications device. The system may further comprise a data node in communication with the communications device and the wireless device. The data node may be a computer operative to communicate the message to the wireless device and the return message to the communications device. The system may further include a database in communication with the data node for storing profile information related to the wireless device.

The data node may be further operative to receive a wireless device ID associated with the wireless device and access the database to map the received wireless device ID to the stored profile information related to the wireless device. The stored profile information includes the wireless device ID, a first address for sending the message to the wireless device, and a second address for sending the return message from the wireless device.

The invention may be implemented as a computer process executed on a wireless device, a computing apparatus, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
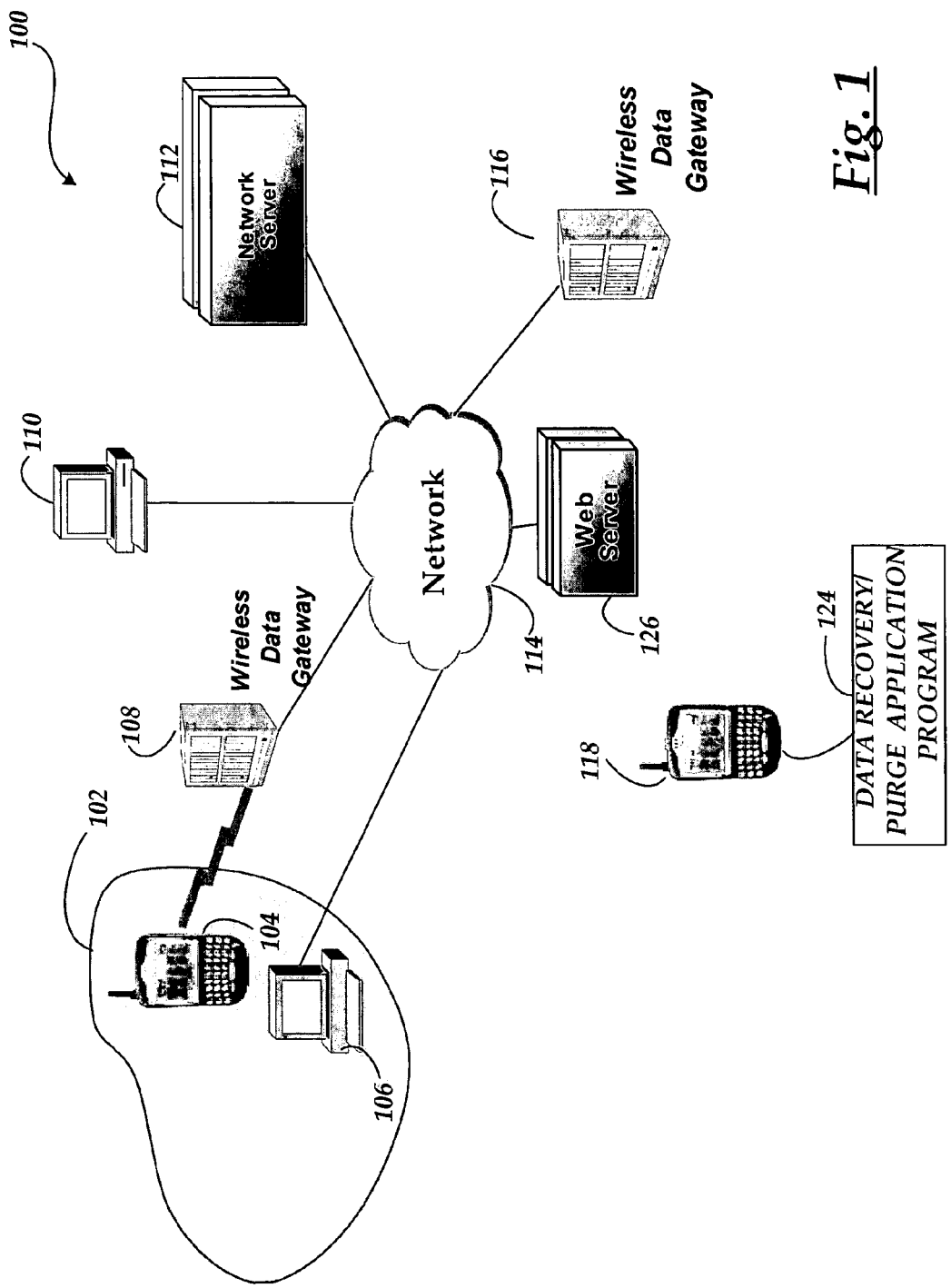
FIG. 1 is a network diagram illustrating aspects of a data communications network utilized in and provided by the various illustrative embodiments of the invention.

In accordance with the present invention, the above and other problems are solved by a system and methods for remotely recovering and purging data from a wireless device in communication with a data network. A data message containing instructions for recovering/purging data stored on the device may be sent to the wireless device. The data message may be received by a recovery/purge application resident on the wireless device. Referring now to the drawings, in which like numerals represent like elements, various aspects of the present invention will be described. In particular, FIGS. 1 and 2 and the corresponding discussion are intended to provide a brief, general description of a suitable communications network environment in which illustrative embodiments of the invention may be implemented.

Referring now to FIG. 1, an illustrative data communications network for performing an illustrative embodiment of the invention will be described. As shown in FIG. 1, communications network 100 includes communications devices 102 for sending and receiving data over a network 114. The communications devices 102 include, for example, a wireless hand-held computer 104 and a personal computer 106. According to an illustrative embodiment, the wireless hand-held computer 104 utilizes a wireless data gateway 108 to send and receive data messages over the network 114. As will be described in greater detail below, the communications devices 102 may be utilized to send data messages over the network 114 to recover and/or purge messages from lost or stolen devices in the communications network 100. The data messages may include, for instance, electronic mail ("e-mail") messages, short message service ("SMS") messages, text messages, or any other message types known to those skilled in the art which may be communicated in a communications network. Those skilled in the art will appreciate that the illustrative embodiments of the invention are not limited to the hand-held computer 104 or the personal computer 106, but may be practiced with other communications devices including, but not limited to, two-way paging devices, voice over Internet protocol ("VOIP") or Internet telephones, microprocessor-based or programmable consumer electronics, minicomputers, mainframe computers, and the like.

The network 114 interconnects communications devices 102 with a network server computer 112 for managing data traffic and a web server computer 126 for delivering web pages to connected devices over the network 114. It should be appreciated that the network 114 may include any type of computing network, including a local area network or a wide area network, such as the Internet. The network 114 provides a medium for enabling communication between the communications devices 102, the server computers 112 and 126, a computer 110, and wireless device 118.

The wireless device 118 may be a hand-held computer. The wireless device 118 sends and receives data messages over the network 114 through communication with wireless data gateways 108 and 116. The wireless data gateways 108 and 116 convert data communicated over a wireless data network (not shown) so that it may be communicated over the network 114. The wireless data gateways 108 and 116 may be implemented with wireless data gateways known to those skilled in the art.

It will be appreciated that according to illustrative embodiments of the invention, the wireless device 118 may further include "smart phone" functionality. As appreciated by those skilled in the art, smart phones combine the functions of a conventional mobile phone with functionality typically included in a personal or hand-held computer. This functionality includes the capability of saving data, executing software programs, sending and receiving e-mail and instant messages, and accessing Web pages over the Internet.

The wireless device 118 is operative to execute a data recovery/purge application 124. According to illustrative embodiments of the invention, the data recovery/purge application 124 may be utilized to recover and/or purge saved data from the wireless device 118, e.g., upon the device becoming lost or stolen. The data recovery/purge application 124 may be executed or invoked upon receiving a message from either of the communications devices 102. The message may contain request data for identifying a lost wireless device, recovering the saved data, purging the saved data, recovering and then purging the saved data, or other instructions. The request data may also contain a return address, such as an e-mail address, for sending the recovered data and/or confirmation of a data purge to the wireless devices 102 or to the computer 110. The functions of the data recovery/purge application 124 will be discussed in greater detail below with reference to FIGS. 3 and 4.

Figure 2:
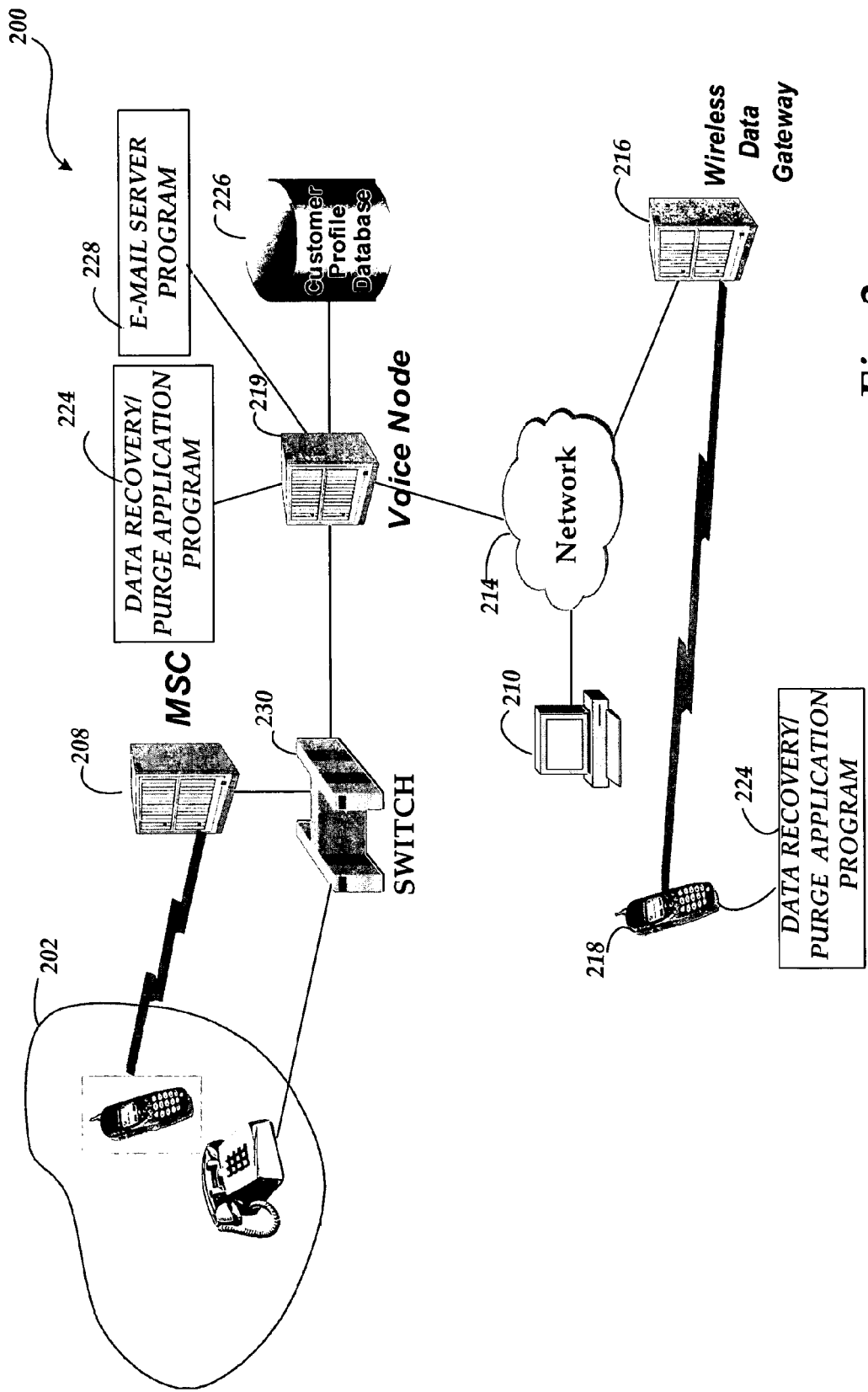
FIG. 2 is a network diagram illustrating aspects of a voice communications network utilized in and provided by the various illustrative embodiments of the invention.

Referring now to FIG. 2, an illustrative voice communications network for performing an alternative illustrative embodiment of the invention will be described. As shown in FIG. 2, communications network 200 includes communications devices 202 for conducting voice and data communications with a switch 230. The communications devices 202 may include a standard wireline telephone set 206 which is connected via a subscriber line to the switch 230. The communications devices 202 also include a wireless telephone 204 which is in wireless communication with a mobile switching center ("MSC") 208. The MSC 208 may be utilized to communicate the wireless voice traffic from the mobile telephone 204 to the switch 230 via a wireline connection. Those skilled in the art will appreciate that the switch 230, the MSC 208 and the connections between them and the communications devices 202 may be components in a typical public switched telephone network ("PSTN"). According to illustrative embodiments of the invention, the switch 230 may be a standard central office circuit switch or a softswitch for routing voice and data traffic in the PSTN.

The communications network 200 also includes a voice node 219 in communication with the switch 230 and a customer profile database 226. According to illustrative embodiments of the invention, the voice node 219 may be a server computer with interactive voice response ("IVR") functionality. For instance, a customer may utilize an IVR to retrieve up-to-date account information from a bank by entering his or her account number on a touch-tone telephone keypad in response to a synthesized voice recording. The IVR will then access a database associated with the bank and retrieve account information associated with the customer's account number. The account information may then be presented to the customer over the telephone via a synthesized voice generated by the IVR.

The communications network 200 also includes a network 214. The network 214 provides a medium for enabling communication between the voice node 219, a computer 210, and wireless device 218. The communication with the wireless device 218 may be enabled through a wireless data gateway 216 which converts data communicated over the network 214 so that it is compatible with a wireless data network (not shown) in communication with the wireless device 218. It should be appreciated that the network 214 may include any type of computing network, including a local area network or a wide area network, such as the Internet.

The voice node 219 is operative to execute a data recovery/purge application program 224 and an e-mail server program 228. According to illustrative embodiments of the invention, the voice node 219 may be utilized to receive a voice call to a special directory number from the switch 230 for locating a lost or stolen wireless device in the communications network 200. The data recovery/purge application 224 may be executed or invoked upon the voice node 219 retrieving information from the database 226 associated with a wireless directory number for the lost or stolen wireless device. The data recovery/purge application 224 may receive this information and compose a message to send to the e-mail server program 228 which then sends the message over the network 214 to a copy of the data recovery/purge application 224 executed on the wireless device 218. As previously discussed with respect to the wireless device 118 in the description of FIG. 1, the wireless device 218 may include smart phone functionality to enable the execution of the data recovery/purge application 224 as well as other software application programs.

The message may contain request data for identifying the wireless device, recovering data saved on the wireless devices, purging the saved data, recovering and then purging the saved data, or other instructions. The request data may also contain a return address, such as an e-mail address, for sending the recovered data and/or confirmation of a data purge to the computer 210. The functions of the data recovery/purge application 224 in the communications network 200 will be discussed in greater detail below with reference to FIGS. 4A and 4B.

Figure 3A:
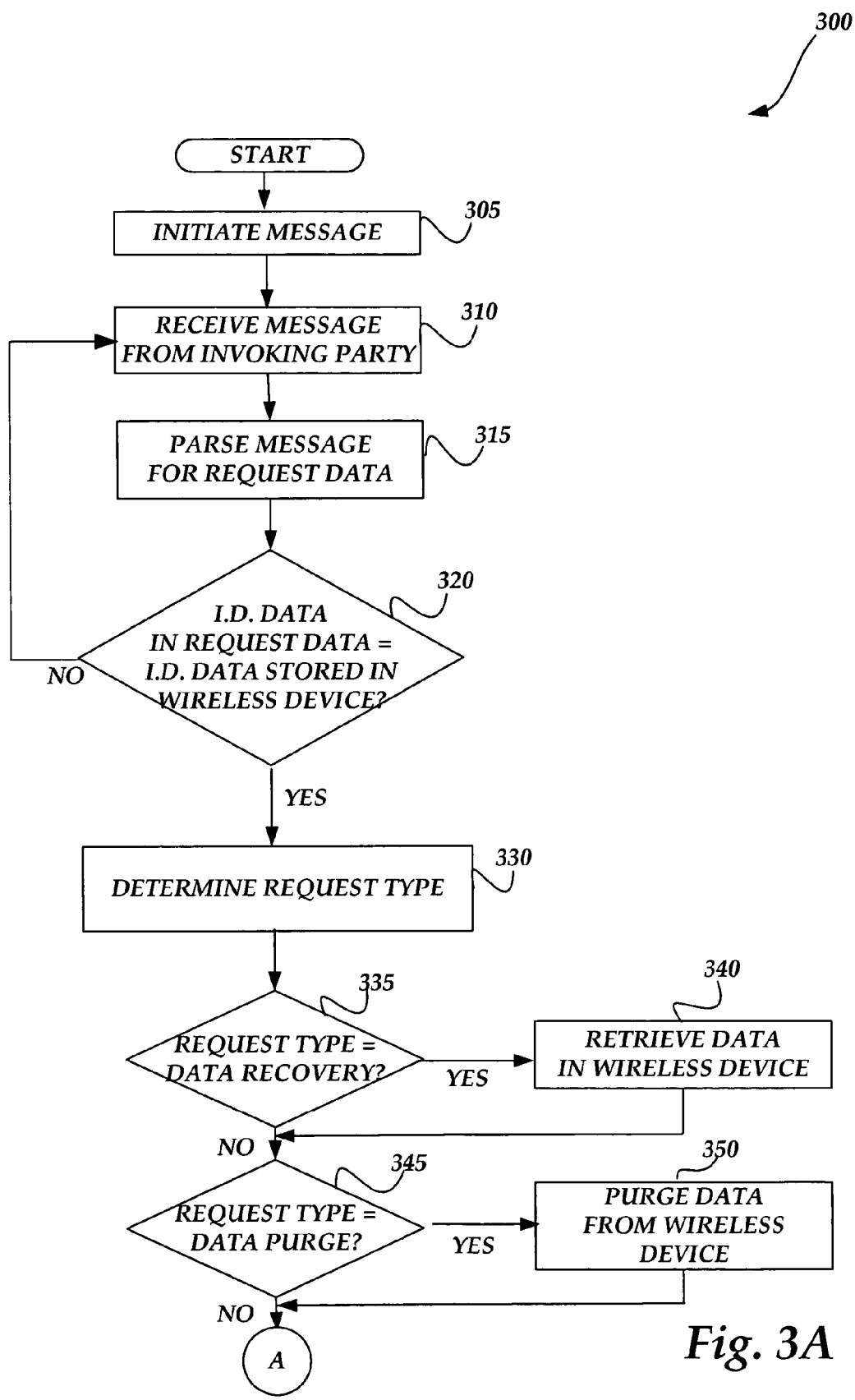
FIG. 3A is a flow diagram illustrating aspects of a process for recovering data, purging data, and performing other operations with respect to a wireless device in the data communications network of FIG. 1, according to an illustrative embodiment of the invention.

Referring now to FIG. 3A, an illustrative routine 300 will be described illustrating an illustrative process that may be performed by the data recovery/purge application 124 for recovering data, purging data, and performing other operations with respect to the wireless device 118 in the communications network 100, discussed above. When reading the discussion of the routines presented herein, it should be appreciated that the logical operations of various illustrative embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 3A-4B, and making up the illustrative embodiments of the present invention described herein are referred to variously as operations, structural devices, acts, or modules. It will be recognized by one skilled in the art that these operations, structural devices, acts, and modules may be implemented in software, in firmware, in special purpose digital logic, and any combination thereof without deviating from the spirit and scope of the present invention as recited within the claims set forth herein.

The routine 300 begins at operation 305, wherein a user/invoking party of the communications devices 102 initiates a message to execute the data recovery/purge application 124 resident in the wireless device 118. In particular, an invoking party in the communications network 100 may initiate a message by sending an e-mail message from the hand-held computer 104 or the computer 106 directly to the wireless device 118 over the network 114. The e-mail message may include a form comprising a number of fields of request data which are parsed by the data recovery/purge application 124 upon receipt of the message. The request data fields may include a key field indicating a unique identification (such as the wireless telephone number) of the wireless device being contacted, a request type field indicating the type of operation to be performed by the recovery/data purge application 124, and a data recovery address which may be an e-mail address for sending recovered data, a purge confirmation, or other data to the invoking party. It should be understood that the message is not limited to an e-mail message but may also take the form of a wireless text messages such as SMS messages in addition to various other types of wireless and wireline messaging known to those skilled in the art.

From operation 305, the routine 300 continues to operation 310 where the message from the invoking party is received at the wireless device 118 at which time the data recovery/purge application 124 is executed. For instance, the wireless device 118 may be preconfigured (i.e., preprogrammed) to automatically execute the data recovery/purge application 124 each time an e-mail message is received. Once executed the data recovery/purge application 124 determines if the received message includes request data as described in detail at operation 315.

From operation 310, the routine 300 continues to operation 315 where the data recovery/purge application 124 parses the received message from the invoking party for request data indicating a request to recover data, purge data, or to perform other operations with respect to the wireless device 118. In particular, the recovery/purge application 124 may be configured to search for request data fields in an e-mail message sent by the invoking party. For instance, the recovery/purge application 124 may initially search for the key field to confirm that the request data in the message is applicable to the wireless device 118.

From operation 315, the routine 300 continues to operation 320 where the data recovery/purge application 124 compares identification information in the request data to identification data previously stored in the wireless device 118. In particular, the recovery/purge application 124 may search for an identification number in the key field in the request data. The identification number may include, for instance, the wireless telephone number of the wireless device 118.

If, at operation 320, the recovery/purge application 124 determines that the identification data does not match the identification data stored in the wireless device 118, the routine 300 branches to operation 310 where the recovery/purge application 124 waits to receive another message from the invoking party. Upon determining a non-match of the identification data, the recovery/purge application 124 may further be configured to generate an alert in a return message to the invoking party indicating that the sent identification data does not match the identification data in the wireless device 118.

If, at operation 320, the recovery/purge application 124 determines that the identification data matches the identification data stored in the wireless device 118, the routine 300 continues to operation 330. At operation 330, the recovery/purge application 124 determines the type of request contained in the request data in the received message from the invoking party. For instance, the recovery/purge application 124 may search a request type field in the received message to identify whether a request was made to recover personal contact data stored in the wireless device 118.

From operation 330, the routine 300 continues to operation 335 where the data recovery/purge application 124 determines whether the request data includes a request to recover the data stored in the wireless device 118. If the request data includes a request to recover the data stored in the wireless device 118, the routine 300 continues to operation 340 where the data recovery/purge application 124 retrieves the data stored in the wireless device 118. In particular, the data recovery/purge application 124 may access the memory in the wireless device 118 and initiate commands to make a copy of the stored data. For instance, the data recovery/purge application 124 may be configured to copy a user's personal data, such as telephone and address data, calendar information, passwords, and account numbers from the wireless device 118 into a data file. The routine 300 then continues to operation 345.

If, at operation 335, the recovery/purge application 124 determines that the request data does not include a request to recover the data stored in the wireless device 118, the routine 300 continues to operation 345 where the recovery/purge application 124 determines whether the request data includes a request to purge the data stored in the wireless device 118. If the request data includes a request to purge the data stored in the wireless device 118, the routine 300 continues to operation 350 where the recovery/purge application 124 purges data stored in the wireless device 118. In particular, the data recovery/purge application 124 may execute a delete command from a menu in the wireless device 118 to purge the stored data. The routine 300 then continues to off-page connector A where the routine 300 continues in FIG. 3B. If, at operation 335, the recovery/purge application 124 determines that the request data does not include a request to purge the data stored in the wireless device 118, the routine 300 continues to off-page connector A where the routine 300 continues in FIG. 3B.

Figure 3B:
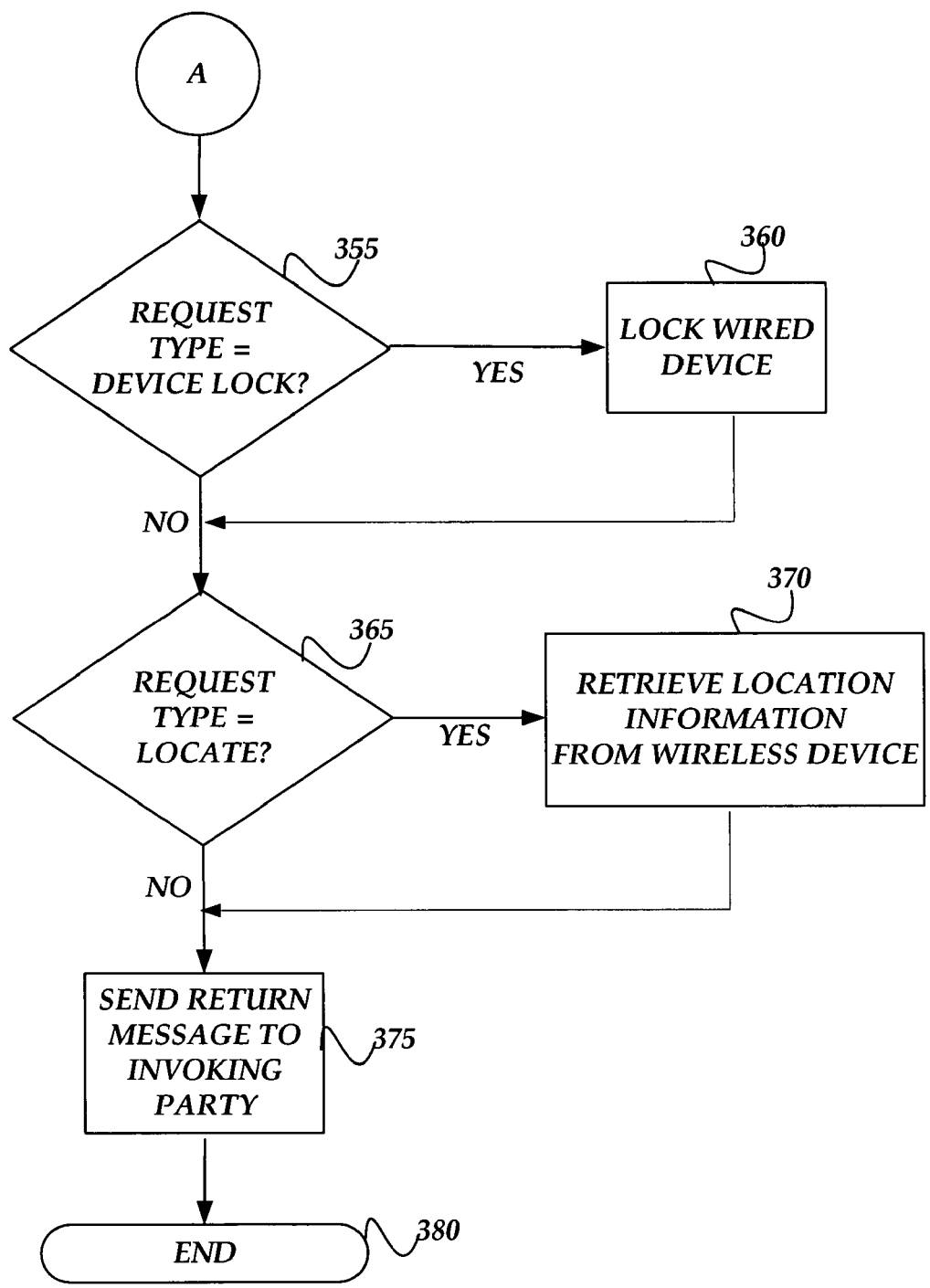
FIG. 3B is a flow diagram continuing the process of FIG. 3A according to an illustrative embodiment of the invention.

Referring now to FIG. 3B, the routine 300 continues from off-page connector A to operation 355 where the data recovery/purge application 124 determines whether the request data includes a request to lock the wireless device 118. If the request data includes a request to lock the wireless device 118, the routine 300 continues to operation 360 where the data recovery/purge application 124 locks the wireless device 118. In particular, the data recovery/purge application 124 may access a menu in the wireless device 118 and enter a numerical code, provided by the invoking party in the request data, to lock the device so that device functions and data are prevented from being accessed by an unknown party. The routine 300 then continues to operation 365.

If the request data does not include a request to lock the wireless device 118, the routine 300 continues to operation 365 where the data recovery/purge application 124 determines whether the request data includes a request to locate the wireless device 118. If the request data includes a request to locate the wireless device 118, the routine 300 continues to operation 370 where the data recovery/purge application 124 executing on the wireless device 118 retrieves location information. In particular, the data recovery/purge application 124, in response to receiving a request for location information, may be configured to access a menu in the wireless device 118 to retrieve location data such as Global Positioning System ("GPS") data (if the wireless device 118 includes this feature). The routine 300 then continues to operation 375.

If the request data does not include a request to lock the wireless device 118, the routine 300 continues to operation 375 where the data recovery/purge application 124 sends a return message to the invoking party. In particular, the data recovery/purge application 124 may initiate and send an e-mail message from the wireless device 118 over the network 114 to a data recovery address or addresses specified in the request data sent by the invoking party. It should be appreciated that the return address may be a different address than the one from which the request data was sent by the invoking party. For instance, the invoking party may have initiated a recovery and purge request from the computer 106 (which may be a home computer) but may wish the recovered data to be sent to an e-mail address associated with the computer 110 (which may be a work computer). Alternatively, the return message may be sent to multiple addresses.

The return message may include the recovered data file as an attachment and an acknowledgement confirming that data was recovered and/or purged from the wireless device 118. In one illustrative embodiment, the data recovery/purge application 124 may be configured to retry a data recovery or purge request until successful. The return message may also include other information requested by the invoking party such as a confirmation that the wireless device 118 was locked or current location information for the wireless device 118. From operation 375, the routine 300 continues to operation 380, where it ends.

Figure 4A:
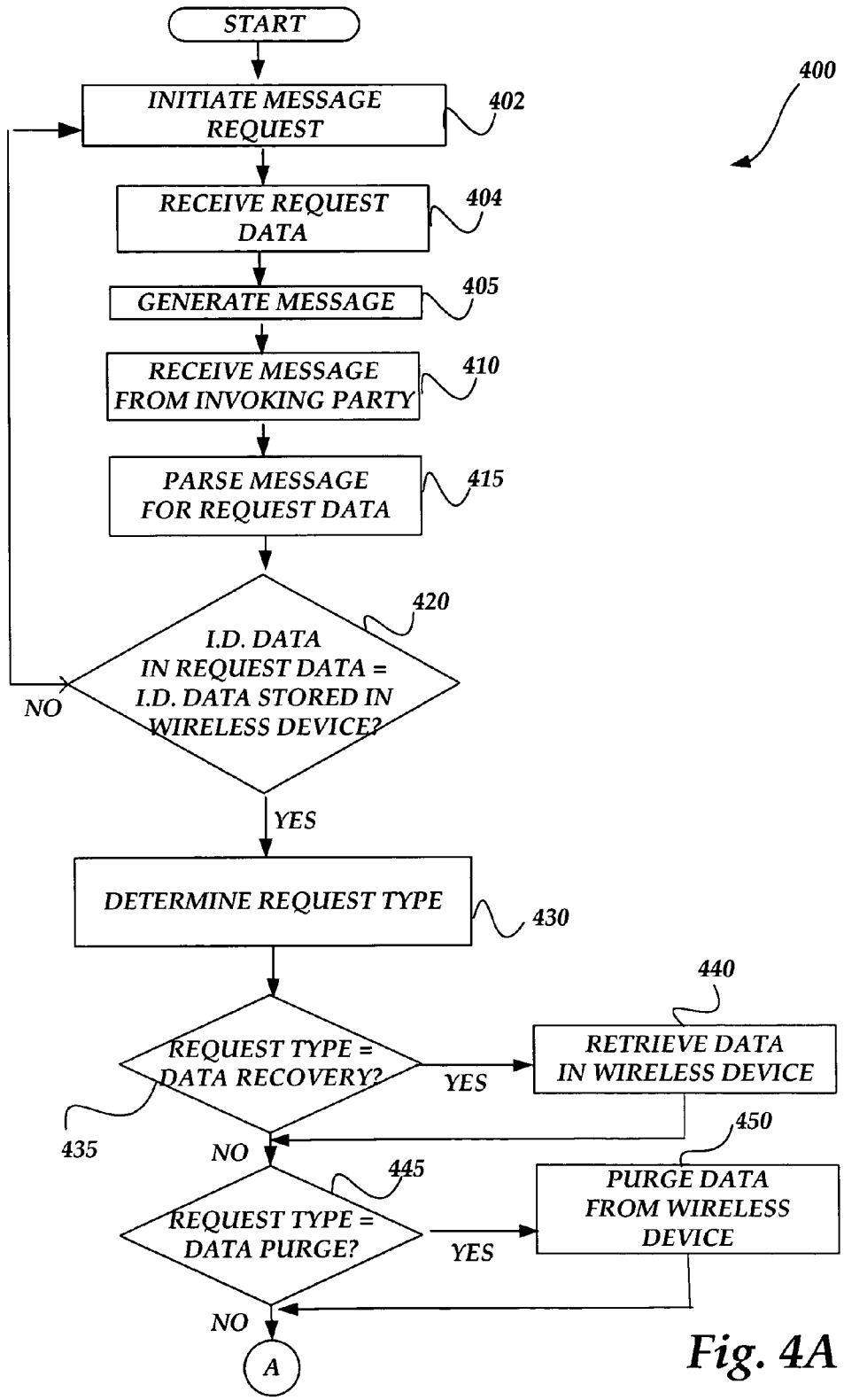
FIG. 4A is a flow diagram illustrating aspects of a process for recovering data, purging data, and performing other operations with respect to a wireless device in the voice communications network of FIG. 2, according to an illustrative embodiment of the invention.

Turning now to FIG. 4A, an illustrative routine 400 will be described illustrating an illustrative process that may be performed by the data recovery/purge application 224 for recovering data, purging data, and performing other operations with respect to the wireless devices 218 in the communications network 200, discussed above. The routine 400 begins at operation 402, wherein a user/invoking party of the communications devices 202 initiates a message request to execute the data recovery/purge application 224 resident in the wireless device 218. In particular, an invoking party in the communications network 200 may initiate a message request by making a voice call to the voice node 219. Upon the completion of the call, the voice node 219 may generate synthesized voice prompts requesting the telephone number of the wireless device 218 and the type of request or requests (e.g., data recovery, data purge, device lock, or device location). Once this information is received, the voice node 219 accesses the database 226 to retrieve profile information which may include identification data associated with the wireless device 218 and a return address to be included in request data received by the data recovery/purge application 224.

From operation 402, the routine 400 continues to operation 404 where the voice node 219 executes the data recovery/purge application 224 which receives the request data stored in the database and provided by the invoking party. In particular, the data recovery/purge application 224 receives the identification data, the return address, and the request type (or types) for generating a message to send to the wireless device 218.

From operation 404, the routine 400 continues to operation 405 where the recovery/purge application 224 executing in the voice node 219 generates a message to execute the data recovery/purge application 224 resident in the wireless device 218. In particular, the data recovery/purge application 224 in the voice node may generate an e-mail message which the e-mail server program 228 sends directly to the wireless device 218 over the network 214. As discussed-above in the description of FIG. 3A, the e-mail message may include a form comprising a number of fields of request data including a key field indicating a unique identification (such as the wireless telephone number) of the wireless device being contacted, a request type field indicating the type of operation to be performed by the recovery/data purge application 224 resident in the wireless device 218, and a data recovery address which may be an e-mail address for sending recovered data, a purge confirmation, or other data to the invoking party. Alternatively, the message may also take the form of a wireless text message such as an SMS messages in addition to various other types of wireless and wireline messaging known to those skilled in the art.

From operation 405, the routine 400 continues to operation 410 where the message from the invoking party is received at the wireless device 218 at which time the data recovery/purge application 224 resident in the wireless device 218 is executed. For instance, the wireless device 218 may be preconfigured (i.e., preprogrammed) to automatically execute the data recovery/purge application 224 each time an e-mail message is received. Once executed the data recovery/purge application 224 determines if the received message includes request data as described in detail at operation 415.

From operation 410, the routine 400 continues to operation 415 where the data recovery/purge application 224 parses the received message from the invoking party for request data indicating a request to recover data, purge data, or to perform other operations with respect to the wireless device 218. In particular, the recovery/purge application 224 may be configured to search for request data fields in an e-mail message. For instance, the recovery/purge application 224 may initially search for the key field to confirm that the request data in the message is applicable to the wireless telephone device 218.

From operation 415, the routine 400 continues to operation 420 where the data recovery/purge application 224 compares identification information in the request data to identification data previously stored in the wireless device 218. In particular, the recovery/purge application 224 may search for an identification number in the key field in the request data. The identification number may include, for instance, the wireless telephone number of the wireless device 218.

If, at operation 420, the recovery/purge application 224 determines that the identification data does not match the identification data stored in the wireless device 218, the routine 400 branches to operation 410 where the recovery/purge application 224 waits to receive another message. Upon determining a non-match of the identification data, the recovery/purge application 224 may further be configured to generate an alert in a return message to the computer 210 associated with the invoking party indicating that the sent identification data does not match the identification data in the wireless device 218.

If, at operation 420, the recovery/purge application 224 determines that the identification data matches the identification data stored in the wireless device 218, the routine 400 continues to operation 430. At operation 430, the recovery/purge application 224 determines the type of request contained in the request data in the received message from the invoking party. For instance, the recovery/purge application 224 may search a request type field in the received message to identify whether a request was made to recover personal contact data stored in the wireless device 218.

From operation 430, the routine 400 continues to operation 435 where the data recovery/purge application 224 determines whether the request data includes a request to recover the data stored in the wireless device 218. If the request data includes a request to recover the data stored in the wireless device 218, the routine 400 continues to operation 440 where the data recovery/purge application 224 retrieves the data stored in the wireless device 218. In particular, the data recovery/purge application 224 may access the memory in the wireless device 218 and initiate commands to make a copy of the stored data. For instance, the data recovery/purge application 224 may be configured to copy a user's personal data, such as telephone and address data, calendar information, passwords, and account numbers from the wireless device 218 into a data file. The routine 400 then continues to operation 445.

If, at operation 435, the recovery/purge application 224 determines that the request data does not include a request to recover the data stored in the wireless device 218, the routine 400 continues to operation 445 where the recovery/purge application 224 determines whether the request data includes a request to purge the data stored in the wireless device 218. If the request data includes a request to purge the data stored in the wireless device 218, the routine 400 continues to operation 450 where the recovery/purge application 224 purges data stored in the wireless device 218. In particular, the data recovery/purge application 224 may execute a delete command from a menu in the wireless device 218 to purge the stored data. The routine 400 then continues to off-page connector A where the routine 400 continues in FIG. 4B. If, at operation 435, the recovery/purge application 224 determines that the request data does not include a request to purge the data stored in the wireless device 218, the routine 400 continues to off-page connector A where the routine 400 continues in FIG. 4B.

Figure 4B:
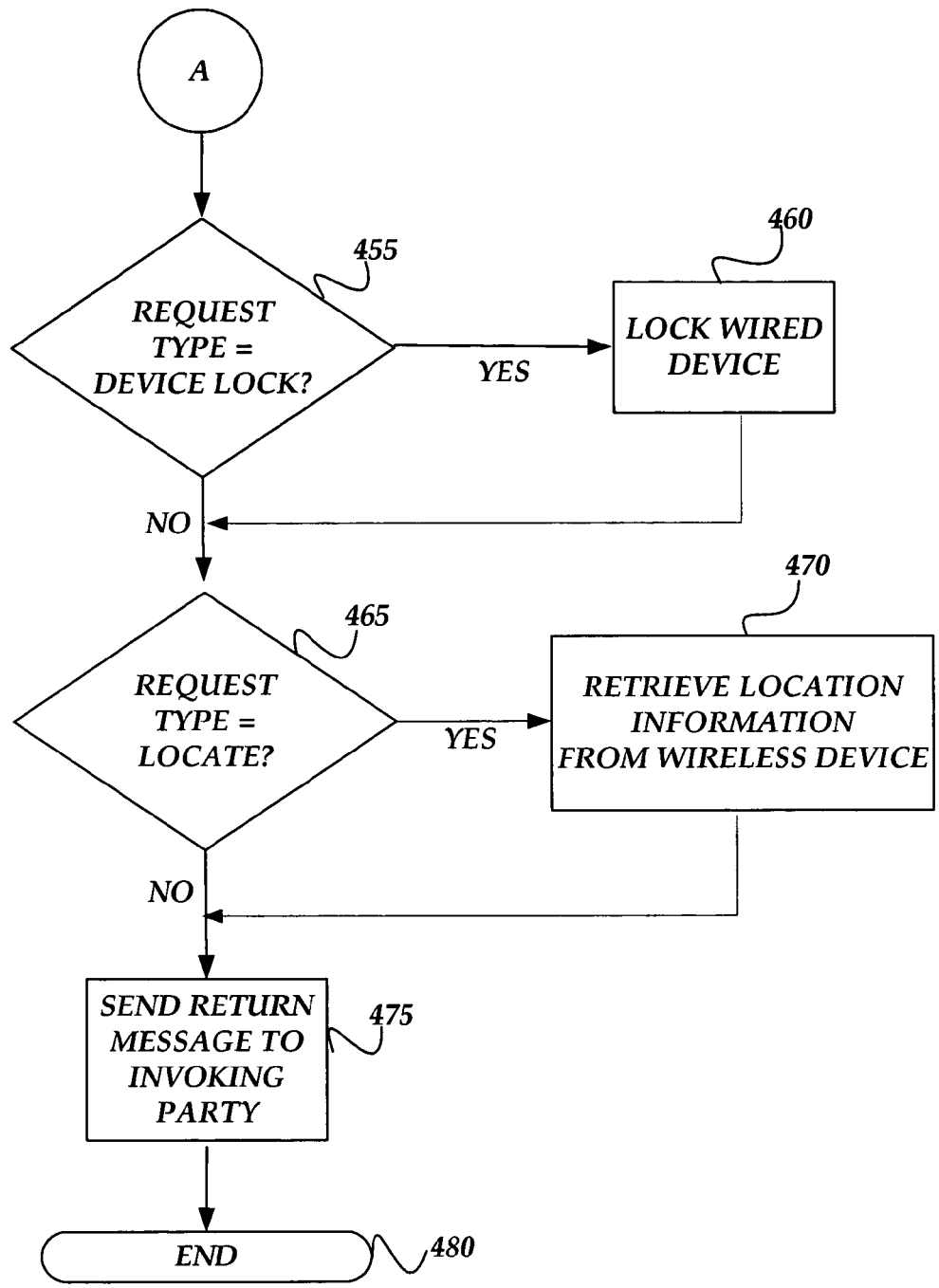
FIG. 4B is a flow diagram continuing the process of FIG. 4A according to an illustrative embodiment of the invention.

Referring now to FIG. 4B, the routine 400 continues from off-page connector A to operation 455 where the data recovery/purge application 224 determines whether the request data includes a request to lock the wireless device 218. If the request data includes a request to lock the wireless device 218, the routine 400 continues to operation 460 where the data recovery/purge application 224 locks the wireless device 218. In particular, the data recovery/purge application 224 may access a menu in the wireless device 218 and enter a numerical code, provided by the invoking party in the request data, to lock the device so that device functions and data are prevented from being accessed by an unknown party. The routine 400 then continues to operation 465.

If the request data does not include a request to lock the wireless device 218, the routine 400 continues to operation 465 where the data recovery/purge application 224 determines whether the request data includes a request to locate the wireless device 218. If the request data includes a request to locate the wireless device 218, the routine 400 continues to operation 470 where the data recovery/purge application 224 executing on the wireless device 218 retrieves location information. In particular, the data recovery/purge application 224, in response to receiving a request for location information, may be configured to access a menu in the wireless device 218 to retrieve location data, such as Global Positioning System ("GPS") data (if the wireless device 218 includes this feature). The routine 400 then continues to operation 475.

If the request data does not include a request to lock the wireless device 218, the routine 400 continues to operation 475 where the data recovery/purge application 224 sends a return message to the invoking party. In particular, the data recovery/purge application 224 may initiate and send an e-mail message from the wireless device 218 over the network 214 to the data recovery address linked to the invoking party in the database 226. It should be appreciated that the return message may be sent to multiple addresses.

The return message may include the recovered data file as an attachment and an acknowledgement confirming that data was recovered and/or purged from the wireless device 218. In one illustrative embodiment, the data recovery/purge application 224 may be configured to retry a data recovery or purge request until successful. The return message may also include other information requested by the invoking party such as a confirmation that the wireless device 218 was locked or current location information for the wireless device 218. From operation 475, the routine 400 continues to operation 480, where it ends.

Based on the foregoing, it should be appreciated that the various illustrative embodiments of the invention include a system and methods for remotely recovering and purging data from a wireless device in a communications network. The above specification, examples and data provide a complete description of the manufacture and use of the composition of the invention. Since many illustrative embodiments of the invention can be made without departing from the spirit and scope of the invention, the invention resides in the claims hereinafter appended.

What is claimed is:

1. A system for remote recovery of data across a communications network, the system comprising:
   a voice node on the communications network, the voice node in communication with a customer profile database, the voice node containing a first data recovery application;
   wherein the voice node receives a voice call from a communication device for locating a wireless device when the wireless device is lost or stolen, the first data recovery application is executed upon the voice node to retrieve information from the customer profile database associated with a wireless directory number for the wireless device, the first data recovery application utilizes the information to compose and send a message to the wireless device to execute a second data recovery application according to the message, and
   wherein the message includes a request to transmit data stored on the wireless device to a data recovery address, the data recovery address being accessed from the customer profile database.

2. The system of claim 1, further comprising a switch on the communications network, wherein the switch connects the communication device with the communications network.

3. The system of claim 2, wherein the switch on a public switched telephone network.

4. The system of claim 2, wherein the switch is a mobile switching center.

5. The system of claim 1, wherein the communication device is one of a standard wireline telephone set and a wireless telephone.

6. The system of claim 1, further comprising a second network in communication with the communications network, wherein the second network enables communication between the wireless device and the voice node.

7. The system of claim 6, wherein the second network is one or more of a local area network and a wide area network.

8. The system of claim 1, wherein the message contains a request to purge saved data from the wireless device.

9. The system of claim 8, wherein the message further contains a return address for a confirmation of a data purge.

10. The system of claim 1, wherein the voice node is a server computer with interactive voice response functionality.

11. A method for remote recovery of data, the method comprising:
    responsive to a voice command for locating a wireless device that is lost or stolen, composing a message to the wireless device based upon information retrieved from a customer profile database associated with a wireless directory number for the wireless device, the message including a request to recover data saved on the wireless device and transmit the data to a data recovery address, the data recovery address being retrieved from the customer profile database;
    wherein the wireless device executes a second data recovery application to transmit the data to the data recovery address according to the message.

12. The method of claim 11, wherein the message contains a request to purge saved data from the wireless device.

13. The method of claim 12, wherein the message further contains a return address for a confirmation of a data purge.

14. The method of claim 11, wherein the communication device is one of a standard wireline telephone set and a wireless telephone.

15. The method of claim 11, wherein a second network is in communication with the communications network, the second network enabling communication with the wireless device.

16. The method of claim 11, further comprising executing an e-mail server program to send the message to the wireless device.

* * * * *